Sept. 4, 1945.   J. W. BURNETT   2,384,235
RE-BRASS TRUCK
Filed Aug. 26, 1944
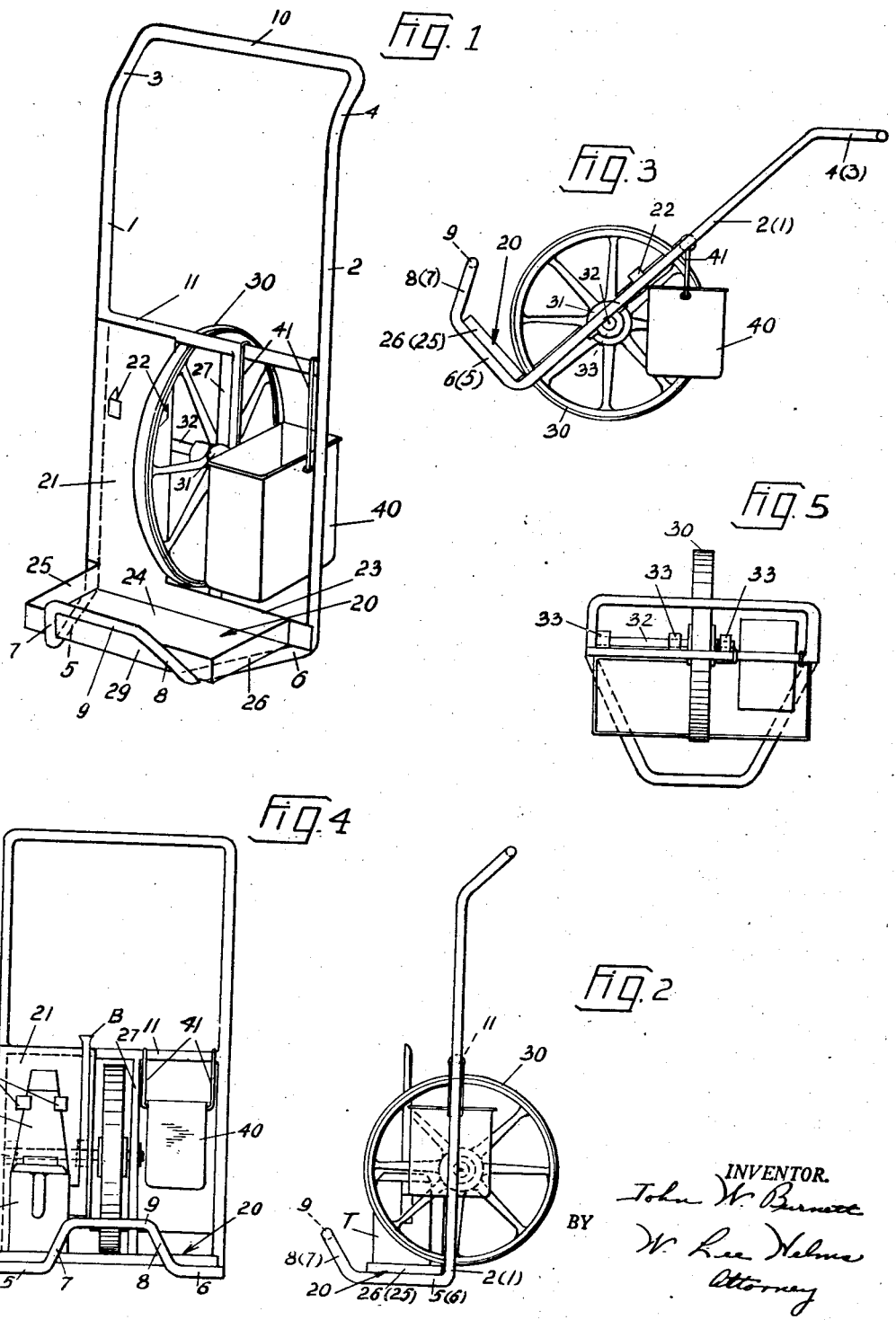

Patented Sept. 4, 1945

2,384,235

UNITED STATES PATENT OFFICE 2,384,235

REBRASS TRUCK

John W. Burnett, Chicago, Ill., assignor to Reynolds Metals Company, Richmond, Va., a corporation of Delaware Application August 26, 1944, Serial No. 551,330

6 Claims. (Cl. 280—52)

This invention relates to hand trucks, and more particularly, to a hand truck adapted to facilitate the operation of re-brassing the journals of railway cars by providing an ideally suited means for transporting the necessary tools and re-brassing materials to the journal or journals requiring attention. The improved hand truck of this invention, which will be referred to as a "re-brass hand truck," is serviceable in classification yards, repair yards, stations, or on trains, passenger or freight, enroute. In any of such places, the improved re-brass truck will save delay to train movement by reducing the time and hard labor required to transport re-brassing materials, jack and other heavy tools, to the impaired journal, especially in the case of long freight trains. Further objects of the invention are: to provide a re-brass truck which may be freely wheeled long distances either alongside a stalled train enroute or between standing trains in a classification yard, and at the same time permit ready movement of the truck between cars on adjacent tracks; to provide a re-brass truck which will eliminate hazard of accident to carmen in transporting re-brassing tools and materials; to provide a re-brass truck which can be stored in upright position occupying very little space in caboose cars or in handy locations between tracks in classification yards; to provide a re-brass truck which will have assigned spaces, and fastening means, for compactly holding the tools needed for re-brassing, such as a jack, a wheel clamp, pinch bar, and spaces for extra journal bearing or bearings, for brassing materials, and for waste.

For the attainment of the foregoing and such other objects of invention as may herein appear or be pointed out, I have shown an embodiment of my invention in the accompanying drawing, wherein:

Fig. 1 is a perspective view of the re-brass truck in upright (stationary) position, with the tools and re-brassing accessories removed;

Fig. 2 is a side view of the truck in transport position, with the jack, and other tools in place;

Fig. 3 is a side view of the truck in upright, stationary position, with the jack, and other tools in place;

Fig. 4 is a front view of the truck shown in Fig. 3, i. e., in upright position with the re-brass accessories in place; and Fig. 5 is a top view of the truck of Figs. 1, 3 and 4, i. e., in upright, stationary position, but without the presence of the re-brass equipment.

The frame of the re-brass truck is formed from a length of pipe or tube welded or otherwise joined at its ends into the endless tubular frame, best shown in Fig. 1, which has a pair of parallel upright portions 1 and 2 which are sloped rearwardly at their upper ends, 3 and 4, respectively, which sloped portions 3 and 4 are joined by the horizontal hand rail portion 10 of the tubular frame. At the lower end of uprights 1 and 2 the tubular frame has inwardly directed, horizontal portions, respectively, 5 and 6, which portions terminate in shorter portions, respectively, 7 and 8, which also are directed inwardly but which are, in addition, tilted or inclined upwardly. The upwardly tilted and inwardly directed portions 7 and 8 are joined by a short horizontal loop portion 9, which parallels the horizontal hand rail 10 which closes the upper end of the tubular frame. In addition to the upper rail 10 and the bottom loop portion 9, the two side uprights 1 and 2 are braced by a cross rail 11, which may also be tubular.

Supported by, and secured to, certain portions of the tubular frame, is a sheet metal structure comprising a wall panel 21 and a base receptacle 20 having side walls 25 and 26, front wall 29 and rear wall 23 and a floor 24. The wall panel 21 extends from the bottom inwardly-directed frame members 5 and 6 to the cross-piece 11. It will be noted, best from Fig. 1, that the major portion of the wall panel is removed, leaving only the panel 21 at the left and the rear wall 23 of the base receptacle 20 along the bottom. Left wall panel 21 is secured along its top edge to the cross-piece 11, and along its left edge to the left upright 1 of the tubular frame. The rear wall 23 of the base receptacle 20 is secured at its ends to the respective upright 1 and 2 close to their juncture to the horizontal bottom pieces 5 and 6. The base receptacle 20 rests on the inwardly-directed horizontal portions 5 and 6 of the tubular frame, and is braced along its front wall 29 by the inwardly-directed and upwardly-tilted portions 7 and 8 and also the horizontal loop portion 9 of the tubular frame.

The space between left wall panel 21 and right upright 2 of the frame and between rear receptacle wall 23 and cross-piece 11 of the frame is occupied by a wheel 30 and by a suspended bucket 40. Spoked wheel 30 is journalled by its hub 31, on the right end of a short horizontal spindle 32, the right end of which extends a short distance beyond, or to the right of, the right edge of wall panel 21 where it is secured to a strip 27 which extends from cross-piece 11 to the rear wall 23 of the base receptacle 20. Spindle 32 is secured to the rear side of wall panel 21 and strip 27 by straps or brackets 33. The strip 27 may be omitted, in which case the right end of spindle 32 will cantilever beyond the right edge of wall panel 21, in which case two straps or brackets 33 would be sufficient to secure spindle 32 to wall panel 21. Wheel 30 may be a cast wheel with solid rubber tire and with roller bearings to reduce the frictional resistance of its turning on stationary spindle 32. The diameter of wheel 30 and the distance of its spindle 32 from the bottom end of the tubular frame are such that when the truck is in its upright stationary position, as in Fig. 1, resting on the bottom inwardly-directed portions of the frame, the wheel will be lifted off the ground, as shown in Figs. 1, 3 and 4. To enable the wheel to contact the ground, for transporting the truck, the frame is tilted backwardly, as shown in Fig. 2, which also lifts the lower portions 6 and 5 of the frame off the ground.

The bucket 40, which is provided for cotton waste, is suspended from cross-piece 11 of the tubular frame by a pair of straps 41.

The base receptacle 20, and also wall panel 21, are designed to provide assigned spaces for the tools and supplies required for re-brassing. The chief tool is a 25-ton jack, designated "J" in Figs. 3 and 4 and which is placed in the base receptacle 20, at the left end thereof, i. e., close to the wall panel 21. Another important tool is the wheel clamp, designated "C" in Figs. 3 and 4, which is used to hold the car wheel on the rail while jacking up the journal box to remove journal bearing. A pair of clips 22 are provided on the wall panel 21 for holding the wheel clamp C. The punch bar or jack lever B may rest in the base receptacle 21 to the right of the jack J and wheel clamp C—see Fig. 4. The right portion of base receptacle 20 is reserved for extra brasses and journal bearings.

I claim:

1. In a re-brass truck adapted for transporting a jack, a wheel clamp, a pinch bar, extra journal bearings and cotton waste required for re-brassing operation, in combination, an endless tubular frame having parallel uprights sloped rearwardly at their upper ends and joined by a horizontal hand portion, and having inwardly-directed horizontal portions at their lower ends, said horizontal portions terminating in upwardly-inclined, inwardly directed portions joined by a horizontal loop portion, the said parallel uprights being braced substantially at their mid-point by a tubular cross-piece, a sheet metal structure comprising a wall panel and a base receptacle, the said base receptacle seated on the said inwardly-directed horizontal portions of the tubular frame with its rear wall secured at its ends to the said pair of uprights, the said wall panel disposed between the said rear receptacle wall and the said tubular cross-piece and extending a short distance from the left upright of the tubular frame, the said wall panel being secured along its upper edge to the said cross-piece and along its left edge to the said left upright, the said base receptacle being adapted to hold the said jack, pinch bar and extra journal bearings, the said wall panel being provided with clips to hold the said wheel clamp, a spindle horizontally secured to the said wall panel with a short length thereof extending beyond the right edge of the wall panel, a rubber tired wheel journalled by roller bearings on the said spindle extension, the diameter of the said wheel and the distance of the said spindle from the said lower portions of the tubular frame being such that the wheel is lifted off the ground in the upright position of the tubular frame resting on its said horizontal lower portions, the said wheel being adapted to contact the ground when the tubular frame is tilted rearwardly to lift its said lower portions off the ground, and a bucket adapted to hold the said cotton waste disposed between the said wheel and the right upright of the tubular frame and suspended from the said cross-piece of the tubular frame.

2. In a re-brass truck adapted for transporting a jack, a wheel clamp, a pinch bar, extra journal bearings and cotton waste required for re-brassing operation, in combination, an endless tubular frame having parallel uprights provided with the said parallel uprights being braced substantially at their mid-point by a tubular cross-piece, a sheet metal structure comprising a wall panel and a base receptacle, the said base receptacle seated on the said horizontal portions of the tubular frame with its rear wall secured at its ends to the said pair of uprights, the said wall panel disposed between the said rear receptacle wall and the said tubular cross-piece and extending a short distance from the left upright of the tubular frame, the said wall panel being secured along its upper edge to the said cross-piece and along its left edge to the said left upright, the said base receptacle being adapted to hold the said jack, pinch bar and extra journal bearings, the said wall panel being provided with clips to hold the said wheel clamp, a spindle horizontally secured to the said wall panel with a short length thereof extending beyond the right edge of the wall panel, a rubber tired wheel journalled by roller bearings on the said spindle extension, the diameter of the said wheel and the distance of the said spindle from the said lower portions of the tubular frame being such that the wheel is lifted off the ground in the upright position of the tubular frame resting on its said horizontal lower portions, the said wheel being adapted to contact the ground when the tubular frame is tilted rearwardly to lift its said lower portions off the ground, and a bucket adapted to hold the said cotton waste disposed between the said wheel and the right upright of the tubular frame and suspended from the said cross-piece of the tubular frame.

3. In a re-brass truck, in combination, an endless tubular frame having parallel uprights provided with horizontal portions at their lower ends, the said parallel uprights being braced substantially at their midpoint by a tubular cross-piece, a sheet metal structure comprising a wall panel and a base receptacle, the said base receptacle seated on the said horizontal portions of the tubular frame with its rear wall secured at its ends to the said pair of uprights, the said wall panel disposed between the said rear receptacle wall and the said tubular cross-piece and extending a short distance from one upright of the tubular frame, the said wall panel being secured along its upper edge to the said cross-piece and along its edge to the said upright, the said wall panel being provided with holding clips, a spindle horizontally secured to the said wall panel with a short length thereof extending beyond the inner edge of the wall panel, a wheel journalled on the said spindle extension, the diameter of the said wheel and the distance of the said spindle from the said lower portions of the tubular frame being such that the wheel is lifted off the ground in the upright position of the tubular frame resting on its said horizontal lower portions, the said wheel being adapted to contact the ground when the tubular frame is tilted rearwardly to lift its said lower portions off the ground, and a bucket disposed between the said wheel and the other upright of the tubular frame and suspended from the said cross-piece of the tubular frame.

4. In a re-brass truck, in combination, an endless tubular frame having parallel uprights provided with forwardly-projecting portions at their lower ends, the said parallel uprights being braced substantially at their mid-point by a tubular cross-piece, a sheet metal structure comprising a wall panel and a base receptacle, the said base receptacle seated on the said forwardly-projecting portions of the tubular frame and the said wall panel disposed between the said base receptacle and the said tubular cross-piece and extending a short distance from one upright of the tubular frame, a spindle horizontally secured to the said wall panel with a short length thereof extending beyond the said edge of the wall panel, a wheel journalled on the said spindle extension, the diameter of the said wheel and the distance of the said spindle from the said lower portions of the tubular frame being such that the wheel is lifted off the ground in the upright position of the tubular frame resting on its said forwardly-projecting portions, the said wheel being adapted to contact the ground when the tubular frame is tilted rearwardly to lift its said lower portions off the ground, and a bucket disposed between the said wheel and the said upright of the tubular frame and suspended from the said cross-piece of the tubular frame.

5. In a re-brass truck, a frame having parallel uprights provided with forwardly-projecting portions at their lower ends, the said parallel uprights being braced substantially at their mid-point by a cross-piece, a sheet metal structure comprising a wall panel and a base receptacle, the said base receptacle seated on the said forwardly-projecting portions of the frame, the said wall panel disposed between the said base receptacle and the said cross-piece and extending a short distance from one upright of the frame, a wheel journalled on the said wall panel, the diameter of the said wheel and the distance of its axis of rotation from the said lower portions of the frame being such that the wheel is lifted off the ground in the upright position of the frame resting on its said forwardly-projecting portions, the said wheel being adapted to contact the ground when the frame is tilted rearwardly to lift its said lower portions off the ground, and a bucket disposed between the said wheel and the said upright of the frame and suspended from the said cross-piece of the frame.

6. In a re-brass truck, in combination, a frame having parallel uprights provided with forwardly-projecting portions at their lower ends, the said parallel uprights being connected by a cross-piece, a sheet metal structure comprising a wall panel and a base receptacle, the said base receptacle seated on the said forwardly-projecting portions of the frame with the said wall panel disposed between the said base receptacle, and the said cross-piece, a wheel journalled on the said wall panel, the diameter of the said wheel and the distance of its said axis of rotation from the said lower portions of the frame being such that the wheel is lifted off the ground in the upright position of the frame resting on its said forwardly-projecting portions, the said wheel being adapted to contact the ground when the frame is tilted rearwardly to lift its said lower portions off the ground.

JOHN W. BURNETT.